(12) United States Patent  (10) Patent No.: US 8,356,710 B2
Roy et al.  (45) Date of Patent: Jan. 22, 2013

(54) MODULAR CONVEYOR BELT

(75) Inventors: Jean-Guy Roy, St-Anselme (CA); Steeve Lapointe, Lévis (CA)

(73) Assignee: GE LeBlanc Inc., St-Anselme (Quebec) (CA)

( * ) Notice: Subject to any disclaimer, the term of this patent is extended or adjusted under 35 U.S.C. 154(b) by 68 days.

(21) Appl. No.: 13/110,570

(22) Filed: May 18, 2011

(65) Prior Publication Data

US 2012/0031743 A1     Feb. 9, 2012

(30) Foreign Application Priority Data

Aug. 5, 2010    (CA) ...................................... 2712181

(51) Int. Cl.
*B65G 29/00* (2006.01)

(52) U.S. Cl. ............................... 198/867.14; 198/803.14

(58) Field of Classification Search .......... 198/850–853, 198/867.01, 867.11, 867.14, 867.15, 803.14
See application file for complete search history.

(56) References Cited

U.S. PATENT DOCUMENTS

| | | | |
|---|---|---|---|
| 2,679,924 A | | 6/1954 | Powell |
| 3,085,462 A | * | 4/1963 | Myers ............................ 411/348 |
| 4,078,654 A | * | 3/1978 | Sarovich ................... 198/867.14 |
| 4,134,181 A | | 1/1979 | Schneider |
| 4,185,734 A | * | 1/1980 | Bross ........................ 198/803.14 |
| 4,778,045 A | * | 10/1988 | Grune et al. ............. 198/867.12 |
| 5,628,393 A | | 5/1997 | Steeber et al. |
| 5,630,499 A | * | 5/1997 | Louden et al. ........... 198/867.14 |
| 5,725,424 A | | 3/1998 | Dufour et al. |
| 5,988,364 A | * | 11/1999 | Boyce et al. ............. 198/867.15 |
| 5,996,768 A | * | 12/1999 | Boyce et al. ............. 198/397.01 |
| 6,176,370 B1 | | 1/2001 | Davies |
| 6,358,135 B1 | | 3/2002 | Post |
| D473,032 S | | 4/2003 | Altom |
| 6,554,129 B2 | | 4/2003 | Straight et al. |
| 6,763,936 B2 | * | 7/2004 | Marsetti et al. ............ 198/844.1 |
| 6,811,021 B1 | | 11/2004 | Corley |
| 7,111,725 B2 | | 9/2006 | Marshall et al. |
| 7,584,837 B2 | | 9/2009 | Roether et al. |
| 8,047,830 B2 | * | 11/2011 | Kiefl ........................ 198/867.14 |
| 2006/0030251 A1 | | 2/2006 | Dufour et al. |

OTHER PUBLICATIONS

O. Heide, Hygienic design solutions for food conveyor belts, Trends in Food Science & Technology, Jan. 2007, p. 589-92, vol. 18, Supplement 1, Elsevier, Kidlington, United Kingdom.

* cited by examiner

*Primary Examiner* — James R Bidwell

(74) *Attorney, Agent, or Firm* — Fish & Richardson P.C.

(57) ABSTRACT

Disclosed is a modular conveyor belt device with a system for easy removal of the belt modules. The belt comprises at least one driving chain and a plurality of belt modules extending transversally and parallely mounted over the entire length of the chains. The belt modules include underside openings, shaped to receive a locking pin extending outwardly from the driving chains and comprising a notch. The belt modules further include side openings intersecting with corresponding bottom openings in which fasteners are removably mounted. Each fastener comprises a projection positionable between a locked configuration and a released configuration. In the locked configuration the projection is embedded in the notch of the locking pin whereas the projection is disembedded from the notch of the locking pin when in the released configuration. The device using the disclosed locking system provides excellent locking capabilities while offering fast and easy removal of the belt modules.

20 Claims, 3 Drawing Sheets

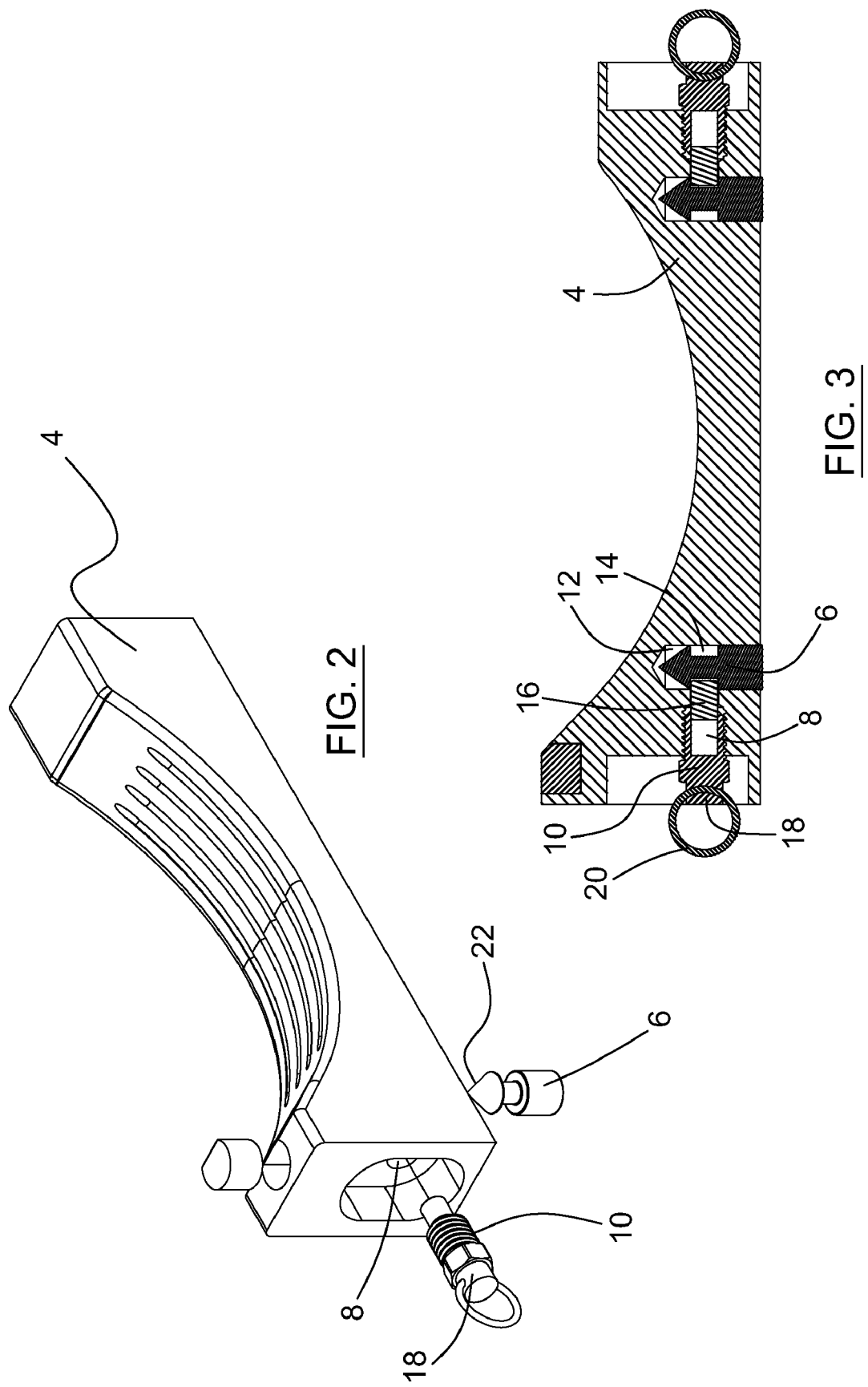

MODULAR CONVEYOR BELT

FIELD OF THE INVENTION

The present invention generally relates to a modular conveyor belt. More particularly, it relates to a modular conveyor belt comprising a plurality of belt modules fastened to the conveyor in such a way as to enable the belt modules to be easily removable.

BACKGROUND OF THE INVENTION

Conveyor belts are widely used in numerous industries to easily move material from one place to another. Such conveyors normally comprise a plurality of belt modules that are usually arranged in a parallel configuration. This modularity of the conveyor belts constitutes an important characteristic as it enables the design of conveyor belts with removable belt modules. Removability of the modules offers several advantages. For example, belt modules that are easily removable allow the modules to be interchanged with other modules having different upper surface shapes in order to accommodate the various shapes and sizes of the material that may be carried by the conveyor. Moreover, in the food industry, rigorous sanitary needs call for a conveyor where the components that are in contact with the food are easily cleanable. On this point, belt modules that are easily removable provide a useful solution as it greatly facilitates the cleaning of these modules.

Several different prior art devices providing removable belt modules that are part of their structure are known to the Applicant.

U.S. Pat. No. 2,679,954 (Powell) discloses a conveyor with removable individual modules that can be attached to the conveyor structure. The modules are attached to the conveyor structure using the flexibility of the module to introduce one side of the module within an opening in the structure.

U.S. Pat. No. 6,176,370 (Davies) teaches another conveyor with easily removable individual modules. According to this invention the modules are attached to the slats of the frame using protrusions extending from the module in a perpendicular direction to the displacement of the module on the conveyor, the protrusions fitting inside corresponding slots.

U.S. Pat. No. 6,554,129 (Straight et al.) teaches a conveyor using a modular conveyor belt where individual attachment elements are attached to the belt modules using two sets of appendages for locking the attachment elements between two sets of consecutive side by side belt modules. According to this invention, the belt modules are held together using hinge pins traversing the ends of the belt modules.

Other devices known to the Applicant include U.S. Pat. No. 4,134,181 (Schneider Jr.), U.S. Pat. No. 5,628,393 (Steeber et al.), U.S. Pat. No. 5,725,424 (Dufour et al.), U.S. Pat. No. 6,358,135 (Post), U.S. Pat. No. D473,032 (Altom), U.S. Pat. No. 6,811,021 (Corley), U.S. Pat. No. 7,111,725 (Marshall et al.), U.S. Pat. No. 7,584,837 (Roether et al.) and US 2006/0030251 (Dufour et al.).

However, none of the prior art documents cited above includes a mechanism using a fastener locking against a vertical locking pin extending outwardly from the conveyor to provide quick removal of the belt modules, while maintaining the modules firmly in place when attached to the conveyor.

Consequently, there is presently a need for a modular conveyor belt having the above-mentioned characteristics in order to hold the modules tightly in place while offering a fast and easy removal mechanism of the modules from the conveyor, such a system being capable of operating reliably over a long period of time.

SUMMARY OF THE INVENTION

An object of the present invention is to provide a modular conveyor belt device that addresses at least one of the above-mentioned needs.

According to the present invention, there is provided a modular conveyor belt comprising at least one driving chain and a plurality of belt modules extending transversally and parallely mounted over an entire length of the at least one driving chain, each belt module comprising:

- at least one bottom opening located underneath the belt module, wherein each bottom opening is shaped to receive a locking pin extending outwardly from the at least one driving chain, the locking pin comprising at least one notch;
- at least one side opening intersecting with the corresponding at least one bottom opening;
- a fastener removably mounted in each of the at least one side opening, each fastener comprising a projection positionable between a locked configuration wherein the projection is embedded into one of the at least one notch of the locking pin and a released configuration wherein the projection is disembedded from the corresponding at least one notch of the locking pin.

Another aspect of the invention concerns a belt module for use on the modular conveyor referred to in the previous paragraph. The characteristics of the belt module, according to this second aspect of the invention, are exactly the same as the ones that were described above when referring to the belt modules comprised in the modular conveyor belt.

The use of the fastener removably mounted in the side opening of the belt module for locking against a locking pin going trough the bottom opening of the belt module provides a solution with excellent locking capabilities, while offering fast and easy removal of the belt modules.

The objects, advantages and features of the present invention will become more apparent upon reading the following non-restrictive description of preferred embodiments thereof, given for the purpose of exemplification only, with reference to the accompanying drawings.

BRIEF DESCRIPTION OF THE DRAWINGS

FIG. 2 is a perspective view of a belt module in accordance with a preferred embodiment of the present invention;

FIG. 3 is another perspective view of the belt module in accordance with a preferred embodiment of the present invention, highlighting the locking mechanism and presented herewith in a locked configuration;

DETAILED DESCRIPTION OF PREFERRED EMBODIMENTS OF THE INVENTION

In the following description, the same numerical references refer to similar elements. The embodiments shown in the figures are preferred.

Although the preferred embodiments of the present invention are illustrated in the accompanying drawings and although the preferred embodiments of the locking mechanism of the modular conveyor belt as shown consist of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the locking mechanism of the modular conveyor belt and corresponding parts according to the present invention, as briefly explained and inferred herein, without departing from the scope of the invention.

Figure 1:
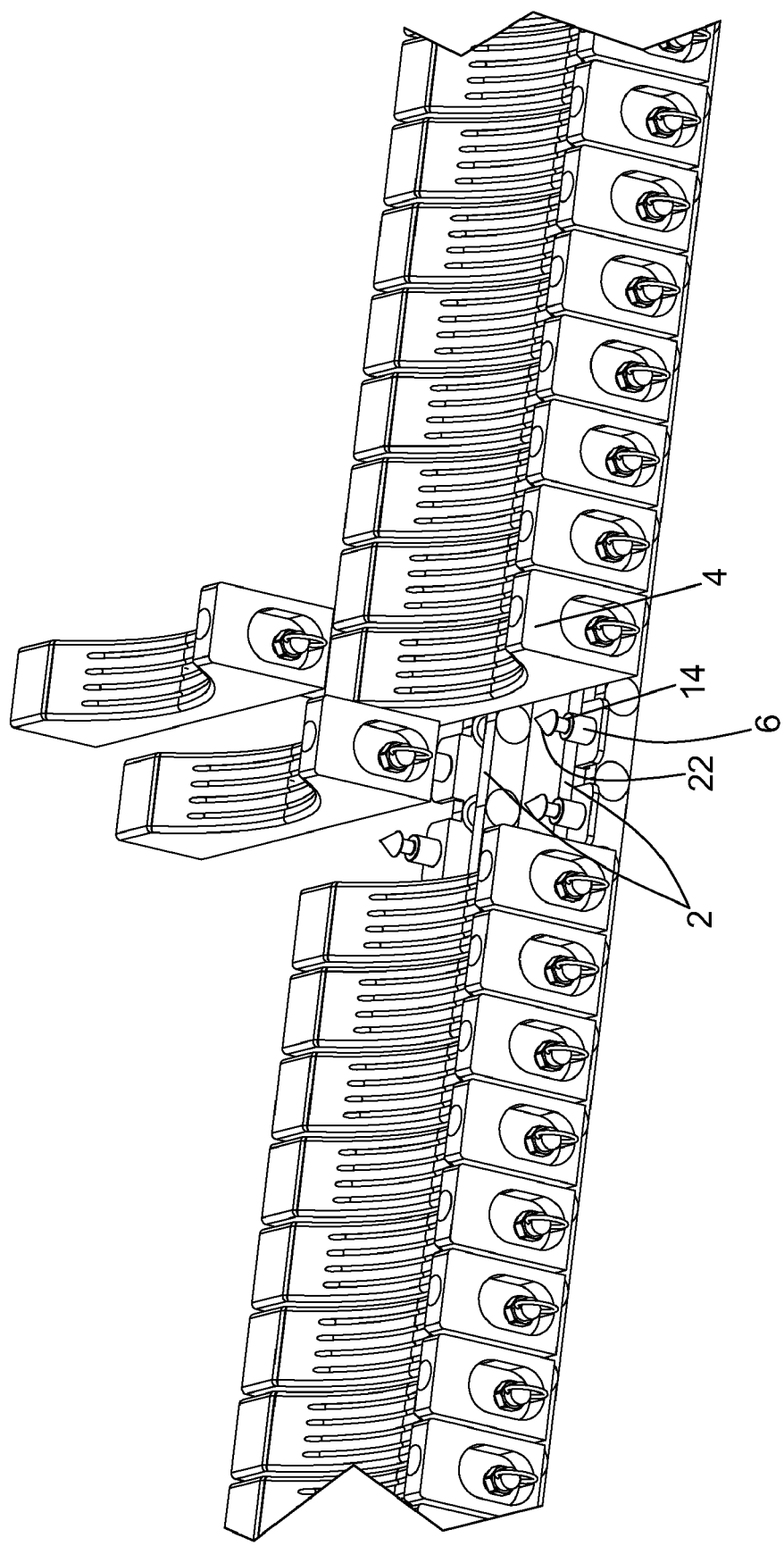
FIG. 1 is a perspective view of a portion of a conveyor belt in accordance with a preferred embodiment of the present invention, wherein one belt module is removed.

Referring to FIG. 1, where a modular conveyor belt device according to a preferred embodiment is shown, the device comprises two parallel driving chains 2 on which are attached a plurality of belt modules 4 extending transversally and mounted over the entire length of the driving chains 2. The belt modules 4, are preferably made of, but not limited to, a rigid plastic material such as nylon. Locking pins 6 are mounted on plates that are themselves mounted onto the chains 2, through soldering or other mounting techniques. The locking pins 6 located on a single chain are arranged at a constant distance from one another as to consequently allow the belt modules mounted on the locking pins 6 to be evenly disposed over the conveyor. Moreover the corresponding locking pins 6 on both chains 2 are horizontally aligned in order to allow the belt modules to consequently be parallely mounted over the conveyor. Each locking pin comprises a notch 14.

Figure 4:
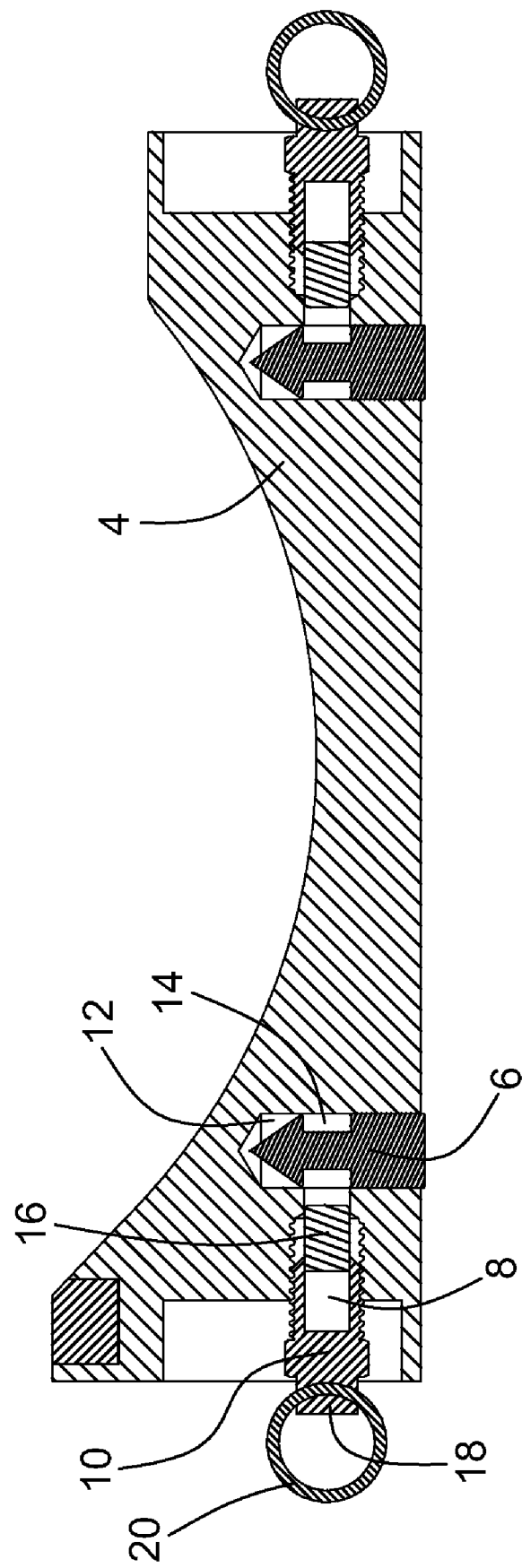
FIG. 4 is yet another perspective view of the belt module in accordance with a preferred embodiment of the present invention, highlighting the locking mechanism and presented herewith in a released configuration

As shown in FIGS. 2 to 4, the belt modules 4, according to the present invention are designed to interact with the locking mechanism disclosed herewith. In the illustrated embodiment, the belt module comprises two bottom openings 12 located underneath the belt module 4. Each bottom opening is shaped to receive the locking pin 6 extending outwardly from the chains 2. The illustrated belt module 4 also comprises two side openings 8 each intersecting with their corresponding bottom opening 12. The side openings 8 are located on both ends of the belt modules 4.

According to this preferred embodiment, the side openings 8 of the belt modules 4 are threaded in order to allow each fastener 10 to be threadably mounted in the side openings 8. However, the fastener 10 can be mounted in the side openings 8 using several other methods know to the person skilled in the art. For example, and without limitation, the fastener 10 may comprise magnetic properties that urge the fastener 10 to attach itself to the locking pin 6, while being releasable for removal and maintenance of the belt module 4.

The fasteners 10 also comprise a projection 16 positionable between a locked configuration and a released configuration. The locked configuration is shown in FIG. 3, wherein the projection 16 is embedded into the notch 14 of the locking pin 6. In contrast, the released configuration is shown in FIG. 4, wherein the projection 16 is disembedded from the corresponding notch 14 of the locking pin 6. The displacement of the projection 16, from a locked to a released configuration can be controlled by an operator with a corresponding displacement of the fastener 18. In the illustrated embodiment, this displacement of the projection 16 is achieved by screwing the fastener in or out of the side opening. The extremity of the fastener 18 can be attached to a handle 20 for convenience of use.

Preferably, as better shown in FIGS. 3 and 4, the side opening 8 and bottom opening 12 of each pair of openings are perpendicular to one another, but the locking mechanism presented herewith can also function with pair of openings that are not perpendicular to one another as long as they intersect in such a way as to allow the projection 16 comprised in the fastener 10 to be embedded into the notch 14 of the locking pin 6.

Preferably, as better shown in FIGS. 1 and 2, the top of each locking pin 6 comprises an alignment surface 22 for aligning the bottom opening 12 with the corresponding locking pin 6 during its insertion thereof. According to this preferred embodiment, the alignment surface 22 of the locking pin 6 is conically shaped to guide the locking pin 6 into the corresponding bottom opening 12 whenever the bottom opening 12 is lowered on the locking pin 6, therefore reducing the need to initially align both elements perfectly when proceeding with the addition of a belt module 4 on the conveyor.

Preferably, as better shown in FIGS. 3 and 4, the side opening 8 and bottom opening 12 of each pair of openings are perpendicular to one another, but the locking mechanism presented herewith can also function with pair of openings that are not perpendicular to one another as long as they intersect in such a way as to allow the projection 16 comprised in the fastener 10 to be embedded into the notch 14 of the locking pin 6.

According to this preferred embodiment, the surface of each belt module is also shaped with an inward concavity in order to allow better support for round shape material while they are being carried on the conveyor.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A modular conveyor belt comprising at least one driving chain and a plurality of belt modules extending transversally and parallely mounted over an entire length of said at least one driving chain, each belt module comprising:
   at least one bottom opening located underneath said belt module, wherein each bottom opening is shaped to receive at least one locking pin extending outwardly from said at least one driving chain, each of said at least one locking pin comprising at least one notch;
   at least one side opening intersecting with the corresponding at least one bottom opening;
   a fastener removably mounted in each of said at least one side opening, each fastener comprising a projection positionable between a locked configuration wherein said projection is embedded into one of said at least one notch of said at least one locking pin and a released configuration wherein said projection is disembedded from the corresponding at least one notch of said at least one locking pin.

2. The modular conveyor belt according to claim 1, wherein the corresponding at least one side opening and at least one bottom opening of said belt modules are perpendicular to each other.

3. The modular conveyor belt according to claim 1, wherein the top of each locking pin comprises an alignment surface for aligning the at least one bottom opening during insertion thereof over the corresponding locking pin.

4. The modular conveyor belt according to claim 2, wherein the top of each locking pin comprises an alignment surface for aligning the at least one bottom opening during insertion thereof over the corresponding locking pin.

5. The modular conveyor belt according to claim 3, wherein the alignment surface is conically shaped.

6. The modular conveyor belt according to claim 4, wherein the alignment surface is conically shaped.

7. The modular conveyor belt according to claim 1, wherein the surface of each belt module is shaped with an inward concavity for supporting round shaped material carried on the conveyor belt.

8. The modular conveyor belt according to claim 2, wherein the surface of each belt module is shaped with an inward concavity for supporting round shaped material carried on the conveyor belt.

9. The modular conveyor belt according to claim 4, wherein the surface of each belt module is shaped with an inward concavity for supporting round shaped material carried on the conveyor belt.

10. The modular conveyor belt according to claim 1, wherein each fastener is threadably mounted in each of said at least one side opening of said belt modules.

11. The modular conveyor belt according to claim 2, wherein each fastener is threadably mounted in each of said at least one side opening of said belt modules.

12. The modular conveyor belt according to claim 4, wherein each fastener is threadably mounted in each of said at least one side opening of said belt modules.

13. A belt module for use on a modular conveyor belt, said modular conveyor belt comprising at least one driving chain, said at least one driving chain comprising a plurality of locking pins extending outwardly therefrom and each comprising at least one notch, said belt module comprising:
   at least one bottom opening located underneath said belt module, wherein each bottom opening is shaped to receive at least one of said locking pins extending outwardly from said at least one driving chain;
   at least one side opening intersecting with the corresponding at least one bottom opening;
   a fastener removably mounted in each of said at least one side opening, each fastener comprising a projection positionable between a locked configuration wherein said projection is embedded into one of said at least one notch of said at least one locking pin and a released configuration wherein said projection is disembedded from the corresponding at least one notch of said at least one locking pin.

14. The belt module according to claim 13, wherein the corresponding at least one side opening and at least one bottom opening of said belt module are perpendicular to each other.

15. The belt module according to claim 13, wherein the surface of said belt module is shaped with an inward concavity for supporting round shaped material carried on the conveyor belt.

16. The belt module according to claim 14, wherein the surface of said belt module is shaped with an inward concavity for supporting round shaped material carried on the conveyor belt.

17. The belt module according to claim 13, wherein each fastener is threadably mounted in each of said at least one side opening of said belt module.

18. The belt module according to claim 14, wherein each fastener is threadably mounted in each of said at least one side opening of said belt module.

19. The belt module according to claim 15, wherein each fastener is threadably mounted in each of said at least one side opening of said belt module.

20. The belt module according to claim 16, wherein each fastener is threadably mounted in each of said at least one side opening of said belt module.

* * * * *